US011206836B2

(12) United States Patent
Anderson

(10) Patent No.: US 11,206,836 B2
(45) Date of Patent: Dec. 28, 2021

(54) INCLUSIVE STEAMING SYSTEM FOR BAKING DOUGH AND METHOD OF BAKING BREAD WITH SELF-INDUCED STEAM

(71) Applicant: Dean Anderson, Garrison, NY (US)

(72) Inventor: Dean Anderson, Garrison, NY (US)

( * ) Notice: Subject to any disclaimer, the term of this patent is extended or adjusted under 35 U.S.C. 154(b) by 17 days.

(21) Appl. No.: 16/450,395

(22) Filed: Jun. 24, 2019

(65) Prior Publication Data

US 2019/0387753 A1 Dec. 26, 2019

Related U.S. Application Data

(60) Provisional application No. 62/688,673, filed on Jun. 22, 2018.

(51) Int. Cl.

| | |
|---|---|
| ***A21B 3/13*** | (2006.01) |
| ***A21B 1/22*** | (2006.01) |
| ***A21D 8/06*** | (2006.01) |
| ***A23L 5/10*** | (2016.01) |
| ***A21B 5/00*** | (2006.01) |

(52) U.S. Cl.

CPC ................ *A21B 3/134* (2013.01); *A21B 1/22* (2013.01); *A21B 3/135* (2013.01); *A21B 5/00* (2013.01); *A21D 8/06* (2013.01); *A23L 5/13* (2016.08); *A23V 2002/00* (2013.01)

(58) Field of Classification Search

CPC ........... A21B 3/134; A21B 3/135; A21B 5/00; A23L 5/13; A21D 8/06; A23V 2002/00

USPC ............................................... 426/18; 99/326

See application file for complete search history.

(56) References Cited

U.S. PATENT DOCUMENTS 4,529,089 A * 7/1985 Gasbarra ............ B65D 81/3407 206/525
4,906,485 A 3/1990 Kirchoff
4,978,542 A 12/1990 Buckley

FOREIGN PATENT DOCUMENTS

EP 0824863 A2 * 2/1998 ............... A21B 3/13

* cited by examiner

*Primary Examiner* — Hamid R Badr
(74) *Attorney, Agent, or Firm* — Vincent G. LoTempio

(57) ABSTRACT

An inclusive steaming system for baking dough and method of baking bread enhances the baking of baguettes by providing an elongated baking container is preheatable to high heat prior to receiving dough. A water-capture platform positions in the cavity of baking container, in a parallel, spaced-apart relationship with bottom wall of baking container. The water-capture platform forms a depression that captures melted ice water. When heated, the water-capture platform generates steam in cavity of baking container from melted ice droplets. A perforated baking panel positions in the cavity of baking container, in an elevated relationship from water-capture platform. The baking panel forms a middle ice trough for ice, and a pair of outer dough troughs for receiving elongated dough. As baking container is heated, steam is generated Spacing and perforation in baking panel provides optimal environment for steam circulation around the dough, creating a crunchy outer crust and chewy crumb.

20 Claims, 5 Drawing Sheets

112 118 110 108 150A 134A 128 120 132 134B 102 152 150B 146b 146a 144

INCLUSIVE STEAMING SYSTEM FOR BAKING DOUGH AND METHOD OF BAKING BREAD WITH SELF-INDUCED STEAM

CROSS REFERENCE OF RELATED APPLICATIONS

This application claims the benefits of U.S. provisional application No. 62/688,673 filed Jun. 22, 2018 and entitled BAGUETTE BAKING APPARATUS AND METHOD OF OPTIMIZING STEAM GENERATION AND CONTAINMENT WHILE BAKING, which provisional application is incorporated by reference herein in its entirety.

FIELD OF THE INVENTION

The present invention relates generally to an inclusive steaming system for baking dough and method of baking bread with self-induced steam. More so, the present invention relates to an inclusive steaming system for baking dough that enhances the baking of traditionally shaped baguettes by providing an elongated baking container that is externally preheatable to high heat prior to receiving the dough, and is configured to optimize the generation and containment of steam by the direct addition of ice during the baking process in a standard kitchen oven.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, making professional grade baguettes with a crispy crust and crumb requires a steam cycle during the initial expansion phase of baking. Thus, high quality baguettes are typically baked in commercial ovens that have a steam injection cycle. The steam injection cycle helps increase the humidity in the commercial oven, so as to enhance the quality of the baguette. It is also known that a "no-knead dough" was recently developed with a higher water content. This is known in the art to have simplified the bread mixing because the enhanced formation of natural gluten from the excess moisture eliminates the kneading that was previously required to develop such a glutinous bread structure.

It is also known that the excess moisture in the "no-knead dough" creates humidity during the baking cycle, and if captured during baking by a "Dutch Oven" or a Cloche, this creates a humid environment around the loaf. This humid environment is desirable for quality crust and crumb. Unfortunately, the Dutch Oven and the cloche limit the shape of the bread to the container shape, and cannot accommodate the addition of ice cubes directly in the container that the bread is held in. Neither the Dutch Oven nor the Cloche are appropriate for the elongated shape of a bread such as baguette—chiefly because they cannot accommodate the size of the standard, commercially available baguette troughs.

Other proposals have involved systems for baking baguettes with crunchy exteriors and chewy crumb. The problem with these baking systems and methods is that they do not bake quality bread in a standard kitchen oven. Also, they do not use self-induced steam for the baking process. Even though the above cited baguette baking devices and methods meet some of the needs of the market, an inclusive steaming system for baking dough and method of baking bread with self-induced steam. More so, the present invention relates to an inclusive steaming system for baking dough that enhances the baking of traditionally shaped baguettes by providing an elongated baking container that is externally preheatable to high heat prior to receiving the dough, and is configured to optimize the generation and containment of steam by the direct addition of ice during the baking process in a standard kitchen oven.is still desired.

SUMMARY

Illustrative embodiments of the disclosure are generally directed to an inclusive steaming system for baking dough and method of baking bread with self-induced steam. The inclusive steaming system for baking dough serves to enhance the baking of traditionally shaped baguettes by providing an elongated baking container that is externally preheatable to high heat prior to receiving the dough, and is configured to optimize the generation and containment of steam by the direct addition of ice during the baking process in a standard kitchen oven. A water-capture platform positions in the cavity of a baking container, in a parallel, spaced-apart relationship with the bottom wall of the baking container. The water-capture platform forms at least one depression that captures melted ice water. When heated, the water-capture platform generates steam from the melted ice water.

A stainless-steel perforated baking panel forms a middle ice trough for receiving ice, and a pair of outer dough troughs for placing elongated baguette dough. The perforated baking panel positions in the cavity of the baking container. A pair of support legs at the edges of the baking panel elevate the baking panel above the water-capture platform, in a parallel, spaced-apart relationship. The spacing and perforation of the baking panel provides an optimal environment for efficient steam circulation around the dough when the ice melts onto the water-capture platform.

A flanged lid covers the baking container. The flanged lid creates a seal with the opening of the baking container, retaining substantially all the released moisture from the melted ice. The perforated baking panel elevates the baguette and ice, in their respective troughs, above the water-capture platform. The spaced-apart relationship and perforations enhance steam circulation from the dough and ice inside the baking container. Initially, the hot steam bakes the dough for a first duration. At which point the flanged lid is removed to release the steam and enable the dough to brown for a second duration. In this manner, the outer crust of the baguette is substantially crunchy and the interior of the baguette is substantially chewy.

In one aspect, an inclusive steaming system for baking dough, comprises:

a baking container defined by sidewalls and a bottom wall enclosing a cavity accessible through an opening;

a flanged lid defined by a perimeter having multiple downwardly oriented lid flanges, the flanged lid being operable to cover the opening of the baking container, the lid flanges extending parallel and adjacent to the sidewalls of the baking container, forming a snug relationship with the sidewalls when the flanged lid covers the opening of the baking container, whereby the relationship between the lid flanges and the sidewalls forms a seal;

a water-capture platform defined by at least one longitudinal depression, a pair of longitudinal platform flanges, and a pair of traversing platform edges, the water-capture platform disposed in a parallel, spaced-apart relationship with the bottom wall of the baking container, whereby the water-capture platform fits in the cavity of the baking container, such that the platform edges engage the sidewalls in a snug relationship; and a perforated baking panel defined by multiple longitudinal troughs disposed in a parallel relationship, the perforated baking panel further being defined by a pair of longitudinal panel edges and a pair of traversing panel edges, the longitudinal panel edges forming a pair of support legs, the perforated baking panel further being defined by a plurality of apertures, the perforated baking panel disposed in a parallel, spaced-apart relationship between the flanged lid and the water-capture platform, whereby the perforated baking panel fits in the cavity of the baking container, such that the panel edges engage the sidewalls in a snug relationship, whereby the pair of support legs rest on the longitudinal platform edges of the water-capture platform, whereby the perforated baking panel is elevated above the water-capture platform.

In another aspect, the system further comprises a pair of container handles affixed to the sidewalls of the baking container.

In another aspect, the system further comprises a pair of platform handles affixed to the traversing platform edges of the water-capture platform.

In another aspect, the container handles and the platform handles are riveted.

In another aspect, the baking container comprises stainless steel.

In another aspect, the sidewalls and bottom wall of the baking container form a generally elongated, rectangular shape, having dimensions of about 9"×18"×4".

In another aspect, the distance between the water-capture platform and the perforated baking panel is at least 1.5 inches.

In another aspect, the perforated baking panel comprises 0.060 perforated aluminum.

In another aspect, the troughs are defined by a peak having a radial curve of about 0.2614.

In another aspect, the multiple longitudinal troughs comprise a middle ice trough and a pair of outer dough troughs.

In another aspect, the middle ice trough is disposed between the outer dough troughs.

In another aspect, the middle ice trough is operable to enable retention of ice.

In another aspect, the outer dough troughs are operable to enable retention of dough.

In another aspect, the ice in the middle ice trough melts to water and falls to the longitudinal depression of the water-capture platform.

In another aspect, the system is heated, such that the ice melts into droplets below the middle ice trough and the heat from the water-capture platform transforms the melted ice droplets into steam, wherein the steam at least partially bakes the dough.

In another aspect, the elevated disposition of the perforated baking panel and the apertures in the perforated baking panel form a space for circulation of steam around the dough.

One objective of the present invention is to optimize the generation and containment of steam by the direct addition of ice during the baking process in a standard kitchen oven.

Another objective is to create and maintain a high humidity environment around the baguette, during baking so as to enhance the crust and crumb.

Another objective is to produce at least one baguette in which the outer crust is substantially crunchy and the interior of the baguette is substantially chewy.

Another objective is to provide a lid having flanges that snugly fit along the sidewalls 104*a-d* of the baking container, so as to retain steam inside the enclosed inner volume of the baking container.

Another objective is to provide a stainless-steel fabrication that is lightweight, is reheatable, retains heat, and radiates heat for baking baguettes.

Another objective is to provide perforations in the platform and baguette and ice trough to enhance steam circulation in the enclosed inner volume of the baking container.

Another objective is to enable multiple baguettes to be baked simultaneously with a cavity to receive and hold ice cubes in middle ice trough.

Another objective is that the negative affect of stove temperature fluctuation minimally affects the contents of the baking container, since the baking container absorbs and retains heat due to the properties of the stainless-steel construction.

Another objective is to inhibit air drafts from entering the enclosed inner volume of the baking container, due to the flanges from the lid and the sidewalls of the baking container. Specifically, the baking container and flanged lid help inhibit incoming air from the oven walls, vents, and oven door, so as to reduce the negative impact on the baguette in the baking container, as it is protected from drafts that may occur during the early part of the baking cycle.

Another objective is to provide a more effective method of generating steam and containing it in close proximity to the developing bread.

Another objective is to provide an inexpensive system for baking baguettes having high quality crust and crumb.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
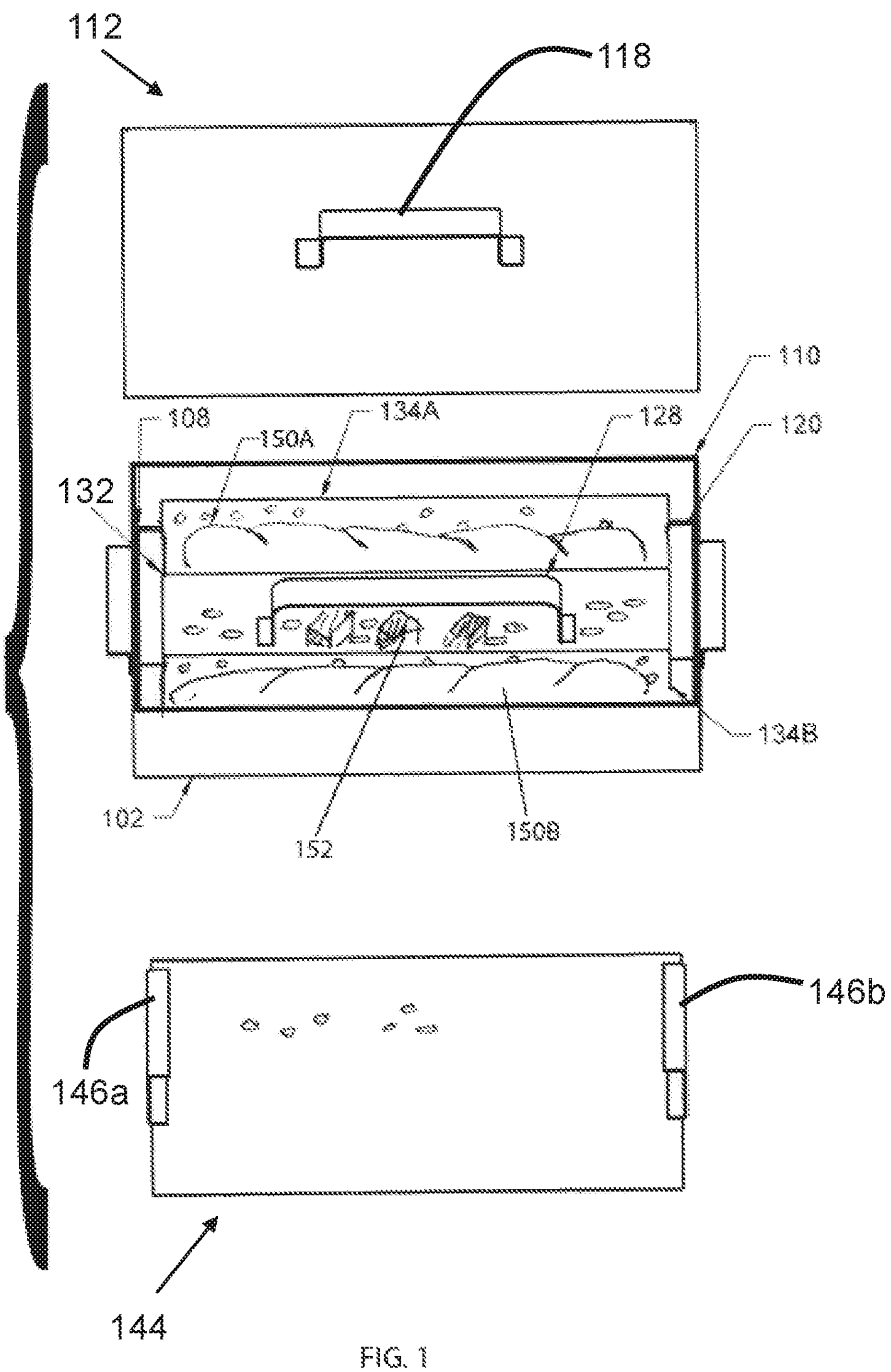
FIG. 1 illustrates a exploded top view of an exemplary inclusive steaming system for baking dough, with flanged lid removed to show baguettes baking and ice melting to generate steam for the baking process, in accordance with an embodiment of the present invention.

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper,” “lower,” “left,” “rear,” “right,” “front,” “vertical,” “horizontal,” and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An inclusive steaming system 100 for baking dough and method of baking bread with self-induced steam is referenced in FIGS. 1-5. The inclusive steaming system 100 for baking dough, hereafter “system 100” comprises a baking container 102 that is defined by sidewalls 104 and a bottom wall 106 configured to enclose a baking cavity 108. In one non-limiting embodiment, sidewalls 104 and bottom wall 106 of baking container 102 form a generally elongated, rectangular shape, having dimensions of about 9"×18"×4". Though in other embodiments, different shapes and sizes are possible, as system 100 is scalable.

In another embodiment, baking container 102 is sized and dimensioned to bake dough 152*a* for producing at least one baguette up to 16" in length. However, dough for other types of breads, cakes, and general baked goods are also possible with the present invention. Further, cavity 108 is accessible from an opening 110 that forms along the upper edges of the sidewalls 104. In one non-limiting embodiment, baking container 102 comprises stainless steel metal fabrication. The stainless-steel design of baking container 102 is generally lighter than ceramic or cast-iron materials of the same capacity, and is thus easier to handle. The stainless steel is also efficacious for withstanding and radiating high temperatures in a standard 30" household oven.

Baking container 102 is configured to be preheated prior to receiving the dough 150*a-b*, and ice 152, and is also configured to retain steam 154 during the critical early stages of loaf development. By preheating baking container 102, the dough 150*a-b* releases steam 154 more efficiently, and with the steam 154 created by the evaporation of the ice cubes directly introduced with the dough 150*a-b*, the steam 154 is thereby generated and contained and circulated throughout cavity 108 of baking container 102.

In one non-limiting embodiment, a pair of container handles 146 affix to the sidewalls 104 of the baking container 102. Container handles 146 may be insulated for when the baking container 102 is heated. In this manner, container handles allow for safe handling of baking container 102 while hot, or while loading and unloading the baguette and ice 152 cube trough. Container handles 146 may be riveted to the shorter sidewalls 104 at the ends of baking container 102. Though in other non-limiting embodiments, handles may be riveted to longer sidewalls 104. In another embodiment, a base panel 144 fits under baking panel 130. Base panel 144 may be perforated and have a pair of handles 148*a*, 148*b* for easy carrying of baking panel 130.

In some embodiments, system 100 may provide a flanged lid 112 that serves the dual purpose of covering the dough 150*a-b*, and retaining steam 154 in the cavity 108 of the baking container 102. Flanged lid 112 is defined by a perimeter 114 having multiple downwardly oriented lid flanges 116. Flanged lid 112 is operable to cover the opening 110 of the baking container 102. Lid flanges extending parallel and adjacent to the sidewalls 104 of the baking container 102. Lid flanges create a snug relationship with the sidewalls 104 when the flanged lid 112 covers the opening 110 of the baking container 102. In this manner, the relationship between lid flanges 116 and upper edges of sidewalls 104 of baking container 102 form a seal. The disposition of flanges 116 inhibits escape of steam 154 from cavity 108 of baking container 102 as the dough 150*a-b* and ice 152 release moisture during the baking process.

Flanges from flanged lid 112 serve as a barrier that forces the released moisture from the dough 150*a-b* to be captured for an extended period within the baking container 102; therefore providing an improved baking method for retaining the humidity from high moisture content dough 150*a-b* and the direct addition of ice cubes. This results in retention of a substantial amount of steam 154 inside baking container 102 during the early expansion phase, thus creating more “oven spring”.

Figure 3:
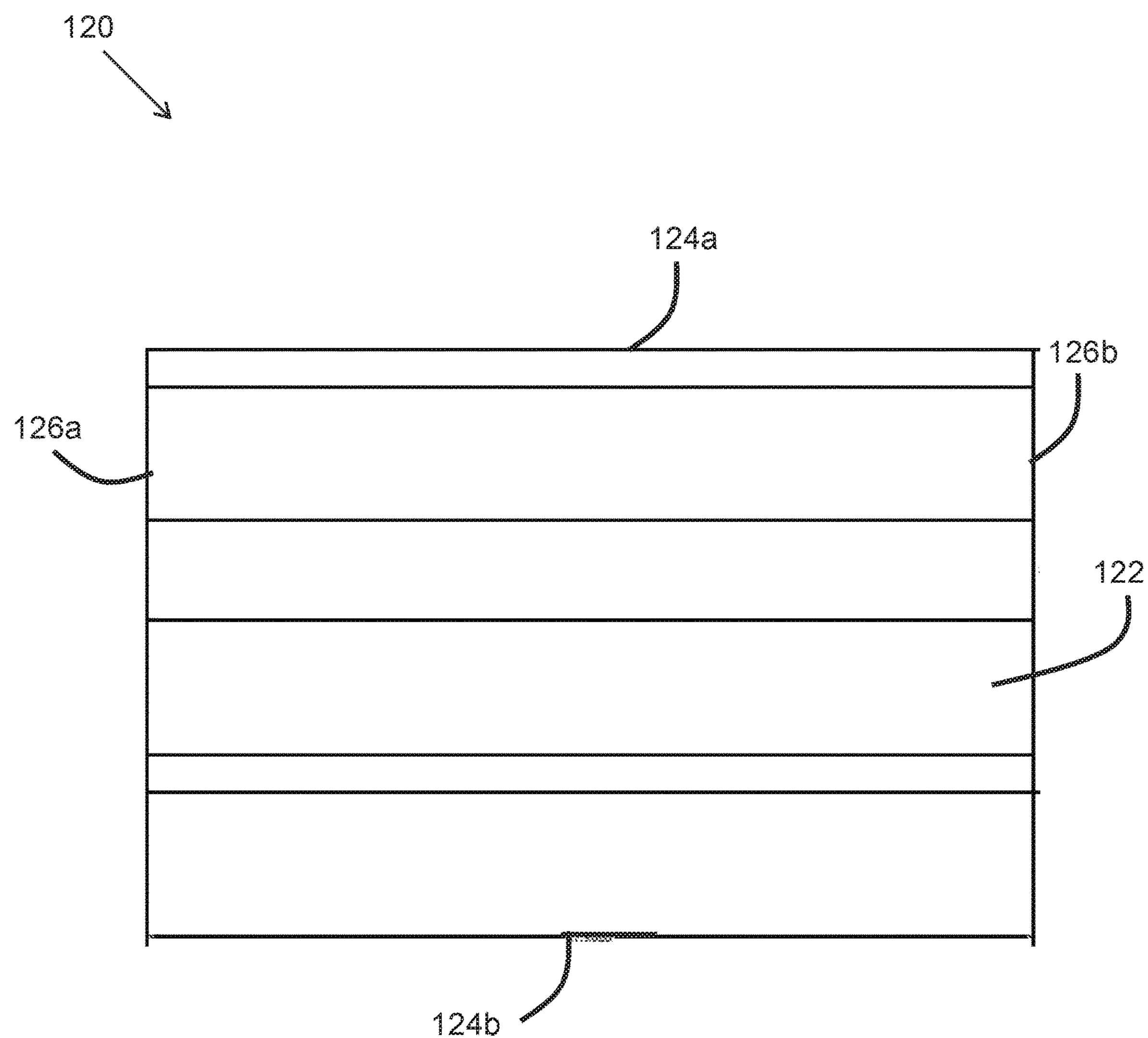
FIG. 3 illustrates a top view of an exemplary water-capture platform, in accordance with an embodiment of the present invention.

As FIG. 3 illustrates, a unique characteristic of baking system 100 is the steam 154 containing efficiency of flanged lid 112 when closing down over the stainless-steel baking container 102, with ⅝" of engagement therebetween. This lid-baking container 102 interaction is different than the prior Dutch Oven or the Cloche that are adapted for bread baking and have a seal area that rests on, but does not close over the upper wall of the baking vessel. Nor can the Dutch Oven or Cloche be used for the standard two or three baguette troughs known in the art, nor can they have ice 152 directly added with their dough 150*a-b* in a trough that will not affect the disposition of the dough 150*a-b*.

Flanged lid 112 is key for enabling a two-phase baking process. The first phase with flanged lid 112 covering baking container 102 creates a high humidity atmosphere for a specific time as steam 154 is retained in the cavity 108 of baking container 102. The second phase with flanged lid 112 removed from baking container 102 is a browning phase, which develops a browning of the crust on the baguette. In one possible embodiment, flanged lid 112 has affixed thereto, a lid handle 118, which is configured to enable facilitated access to the enclosed cavity 108 of the baking container 102, and loading and unloading of ice 152, dough 150*a-b*, and subsequent baguettes. Lid handle 118 is riveted centrally on flanged lid 112.

As discussed below, the seal between at the opening 110 of the baking container 102 restricts escape of steam 154 form the cavity 108 of the baking container 102. For example, baking container 102 produces professional, high quality baguettes because it allows the generation and containment of steam 154 from the excess moisture of the no-knead dough 150*a-b* as well as the evaporating ice 152 cubes, due to the design of the overlapping flanged lid 112. Because the entire apparatus is pre-heated in the oven, it produces more "oven spring" or rapid expansion of the baguette loaf due to the immediate heat radiated from the pre-heated baking container 102, which also contains the humidity until flanged lid 112 is removed and the baguette loaves start developing color.

Turning now to FIG. 3, a water-capture platform 120 provides a unique platform configuration that captures melted ice water and transforms the water droplets to steam 154. Water-capture platform 120 is defined by at least one longitudinal depression 122, a pair of longitudinal platform edges 124*a*, 124*b*, and a pair of traversing platform edges 126*a*, 126*b*. Water-capture platform 120 has a generally flat, rectangular shape that matches the length and width dimensions of the baking container 102.

Figure 4:
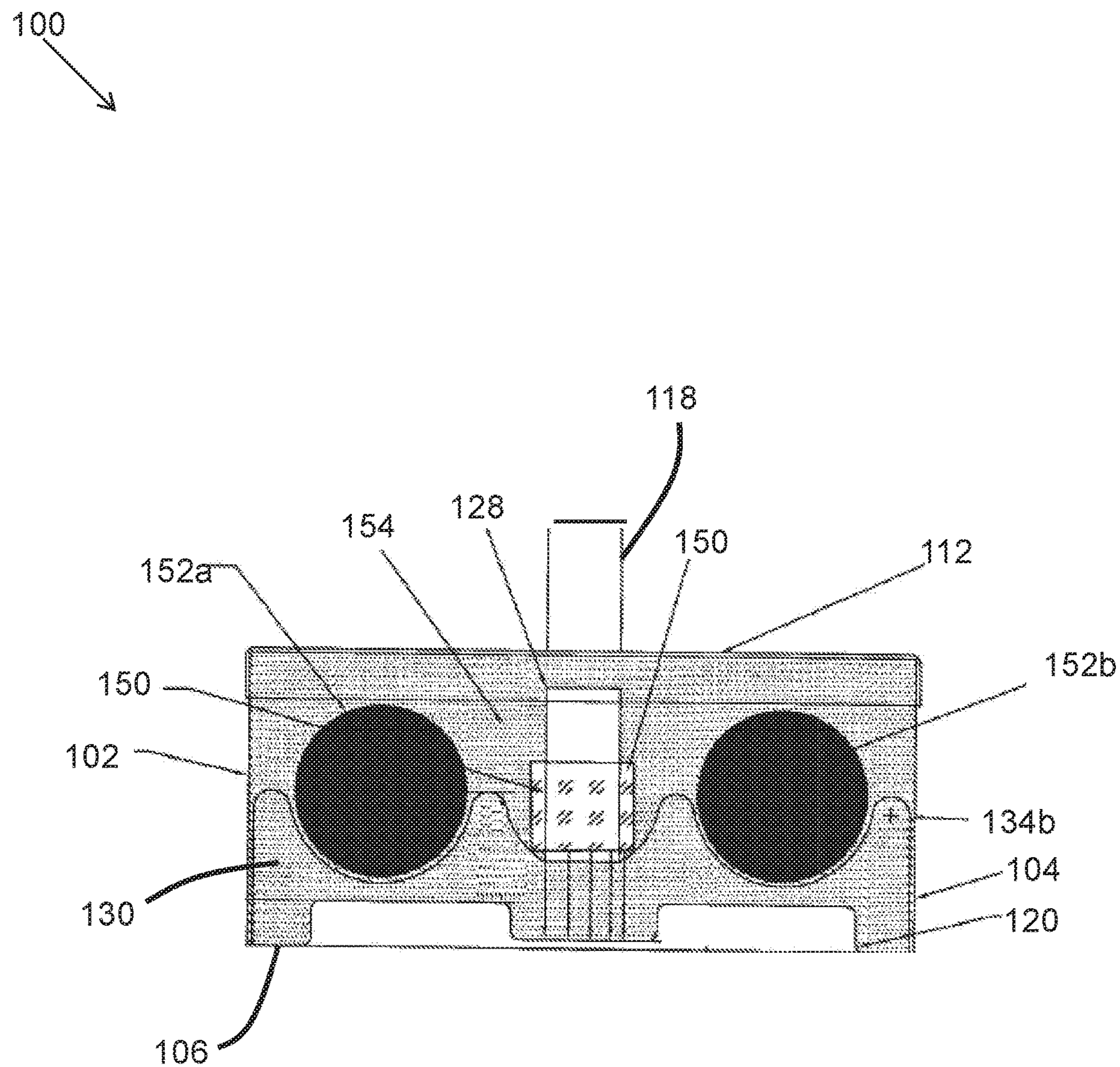
FIG. 4 illustrates a sectioned view of the inclusive steaming system for baking dough, showing the position of the dough and ice on their respective troughs, in accordance with an embodiment of the present invention.

FIG. 4 illustrates a sectioned view of the inclusive steaming system for baking dough, showing the position of the dough and ice on their respective troughs. As illustrated, the water-capture platform 120 is disposed in a parallel, spaced-apart relationship with the bottom wall 106 of the baking container 102. Thus, water-capture platform 120 forms a friction fit, snug relationship when fitting into the cavity 108 of baking container 102. In this manner, the water-capture platform 120 fits in the cavity 108 of baking container 102, such that the platform edges engage sidewalls 104 of baking container 102 in a snug relationship.

The longitudinal depression 122 that forms in the water-capture platform 120 is sized and dimensioned to capture melted ice water droplets from an above-placed perforated baking panel 130, described below. As water-capture platform 120 is heated, the captured ice water droplets are transformed to steam 154.

Figure 2:
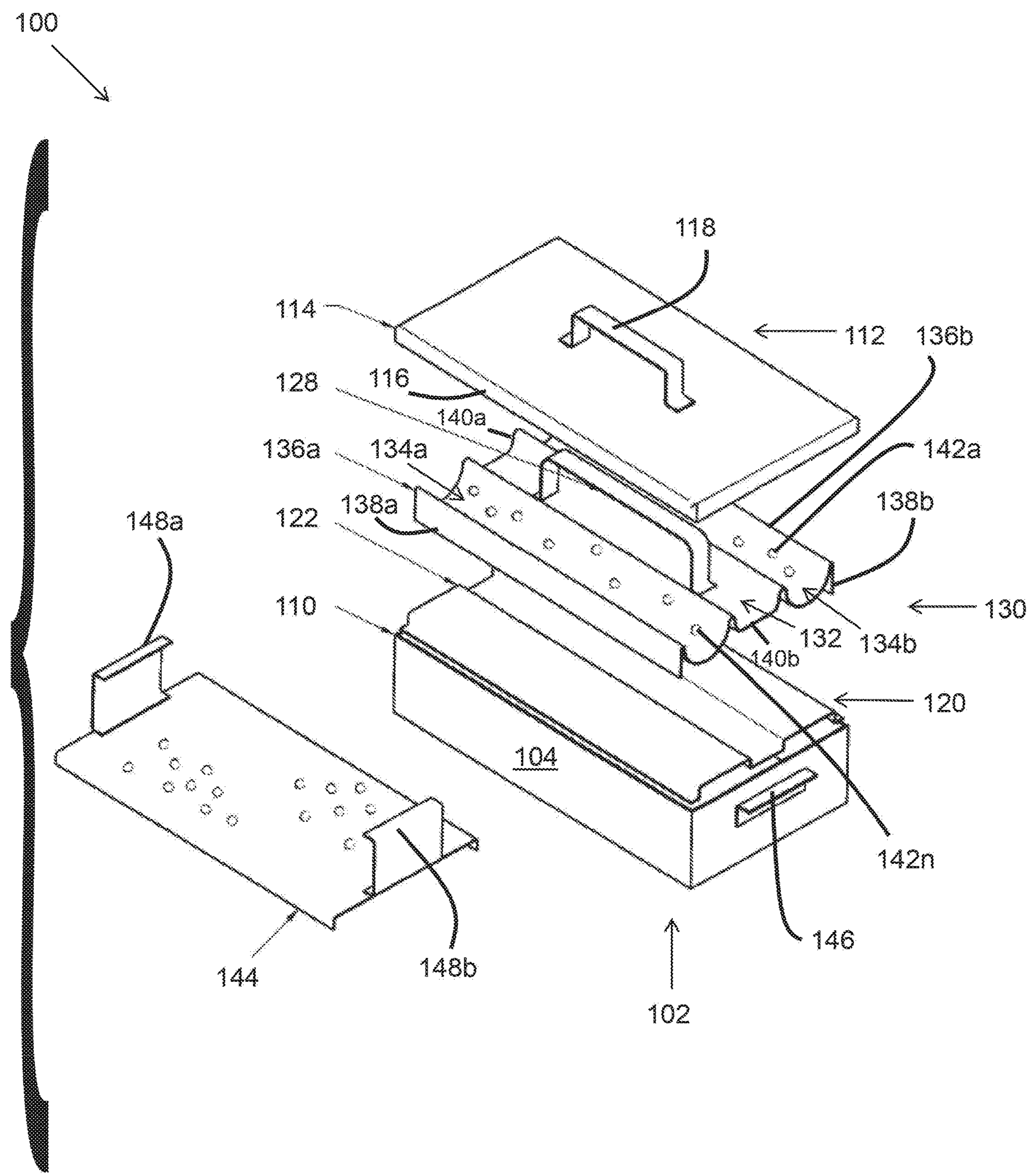
FIG. 2 illustrates a perspective view of the inclusive steaming system for baking dough, showing a baking container, a water-capture platform, a baking panel, and a flanged lid, in accordance with an embodiment of the present invention.

Looking back at FIG. 2, system 100 provides a perforated baking panel 130, on which the dough 150*a-b* for the baguette is baked. Perforated baking panel 130 is defined by a plurality of apertures 142*a-n* that form uniformly across the surface area of baking panel 130. In one possible embodiment, the apertures 142*a*, 142*n* that form through the surface of the baking panel 130 are evenly spaced, so as to enable optimal circulation of steam 154 in the cavity 108 of baking container 102 and around the dough 150*a-b*. In some embodiments, apertures 142*a-n* may be circular, elongated, or have an irregular shape. In one possible embodiment the apertures allow the water droplets from the melting ice to drip through to the water capture tray for steam generation. In one possible embodiment, baking panel 130 comprises 0.060 perforated aluminum. Though other types of cooking materials known in the art may also be used.

In some embodiments, baking panel 130 has a pair of longitudinal panel edges 136*a*, 136*b* and a pair of traversing panel edges 140*a*, 140*b*. This creates a generally rectangular shape that matches the length and width of baking container 102. Longitudinal panel edges 136*a-b* form a pair of support legs. The perforated baking panel 130 fits in the cavity 108 of the baking container 102, such that the panel edges 136*a-b*, 140*a-b* engage the sidewalls 104 in a snug relationship. In another non-limiting embodiment, a panel handle 128 affixes to baking panel 130. Panel handle 128 may be riveted for facilitated carrying. Further, panel handle 128 may be insulated for when the baking container 102 is heated. It is also significant to note that panel handle 128 is configured to hold ice 152 in place in the ice trough 132, serving as a brace thereof.

In some embodiments, perforated baking panel 130 is disposed in a parallel, spaced-apart relationship between flanged lid 112 and water-capture platform 120. In other embodiments, the pair of support legs 138*a*, 138*b* rest on the longitudinal platform edges 124*a-b* of water-capture platform 120. In this manner, baking panel 130 is elevated above water-capture platform 120. In one non-limiting embodiment, the distance between water-capture platform 120 and perforated baking panel 130 is at least 1.5". Thus, the dough/baguette does not directly rest on the bottom wall 106 of baking container 102, which enhances steam 154 circulation from melting ice 152 above, in the enclosed inner volume.

For purposes of baking the baguettes, baking panel 130 is defined by multiple longitudinal troughs 132, 134*a*, 134*b* disposed in a parallel relationship. Troughs 132, 134*a-b* form a wavy configuration, and in one embodiment, the troughs are defined by a peak having a radial curve of about 0.2614. Ice trough 132 and dough troughs 134*a*, 134*b* have substantially the same dimensions. In one non-limiting embodiment, the multiple longitudinal troughs comprise a middle ice trough 132 and a pair of outer dough troughs 134*a*, 134*b*. However, in other embodiments, any number of ice troughs and/or dough troughs may be used. For example, an alternating arrangement of four ice troughs and four dough troughs may be used.

Middle ice trough 132 is disposed between the outer dough troughs 134*a*, 134*b*. Middle ice trough 132 is operable to enable retention of ice 152, such as standard ice 152 cubes known in the art of kitchens and food service 152. It is further operable to allow the dispersion of melting ice into droplets through the apertures down onto the water capture platform 120. Dough troughs 134*a*, 134*b* are operable to enable retention of dough 150*a-b*. In one non-limiting embodiment, baking platform supports a standard two and three loaf baguette troughs, such as a 16" baguette known in the art. In another embodiment, perforated dough trough in baking platform is configured to support commercial baguette troughs, and round and oval baguette troughs as well as ice 152 cubes in middle ice trough 132.

In operation, baking container 102 is preheated for a first duration, such as 20 minutes at 450°. After the first duration, the baking container 102 is loaded with the water-capture platform 120, baking panel 130, ice 152, and dough 150*a-b*, each in their respective position. In one exemplary use, ice 152 is placed in the middle ice trough 132 (FIG. 4). Water-capture platform 120 positions above bottom wall 106 of baking container 102. Then, baking platform is placed above water-capture platform 120 in the spaced-apart relationship, as support legs maintain the desired spacing therebetween. Dough 150*a*, 150*b* is prepared, and placed longitudinally in the respective dough troughs 134*a*, 134*b*. Flanged lid 112 is placed over opening 110 of baking container 102, and baking container 102 is returned to oven for heating a second duration. This may include a 20-minute wait.

Inside cavity 108 of baking container 102, the heat melts the ice to water droplets, which disperse through the perforation in the baking panel 130 to the longitudinal depression of the water-capture platform 120 (FIG. 4). As baking container 102 is heated, ice melts in the middle ice trough 132 and the heat from the water-capture platform 120 transforms the melted ice water droplets to steam, wherein the steam at least partially bakes the dough. The seal between flanged lid 112 and edges of sidewalls 104 of baking container 102 maintain a high humidity environment around the dough, during baking so as to enhance the crust and crumb of baguette.

Advantageously, apertures 142*a-n* in baking panel 130, and the space between baking platform and water-capture platform 120, along with volume of cavity 108 create an optimal circulation of steam around the dough. Initially, the hot steam bakes the dough for a first duration. At which point the flanged lid 112 is removed to release the steam and enable the dough to brown for a second duration. In this manner, the outer crust of the baguette is substantially crunchy and the interior of the baguette is substantially chewy.

Figure 5:
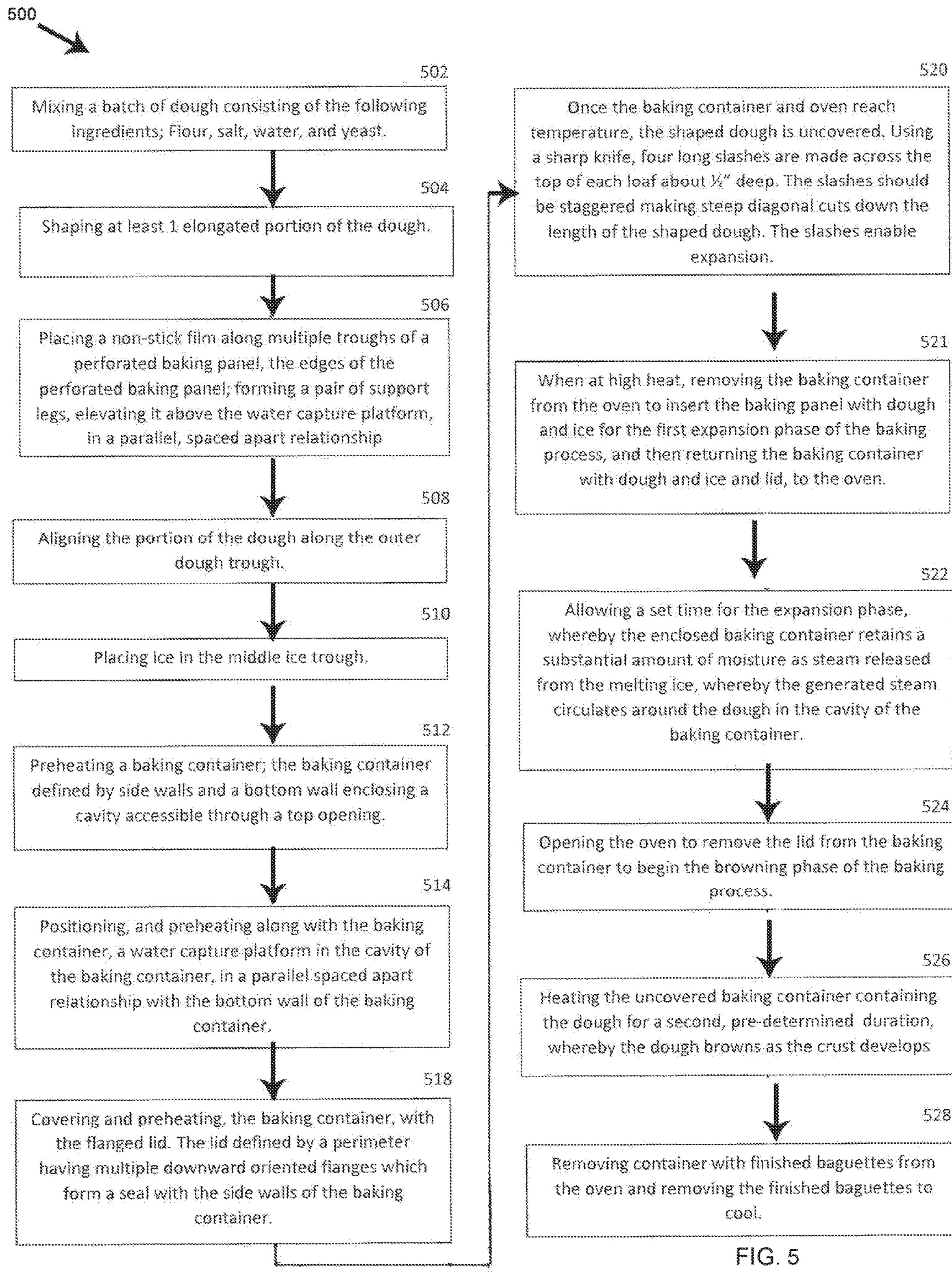
FIG. 5 illustrates a flowchart of an exemplary method of baking bread with self-induced steam, in accordance with an embodiment of the present invention.

FIG. 5 illustrates a flowchart diagram of an exemplary method 500 of baking bread with self-induced steam. The method may include an initial Step 502 of mixing a batch of dough, consisting of the following ingredients: flour, salt, water, and yeast. These ingredients are combined in a large mixing bowl. The yeast is stirred into warm water until dissolved. Then poured into the bowl stirring until the dough is just sticking together and pulling from the sides of the bowl, about a minute or less. The dough will be wet and sticky. This mixture is covered tightly with clear wrap. It is allowed to rise at room temperature for 8 hours minimum; overnight or during the workday is ideal. These 8 hours are critical to the development of flavor.

Method 500 may further comprise a Step 504 of shaping at least one elongated portion of the dough. Line the two troughs of your baguette pan with 3" wide strips of parchment paper. Turn out the dough onto a generously floured work surface using a wet, flexible spatula. Using a dough scraper, gather the dough into a mound by folding it in half twice. The dough is cut into two equal lumps and let them rest for about 10 minutes. The dough should become soft and workable, if not, it should sit a few minutes longer.

Next, the lumps of dough are shaped into baguettes one at a time, dusting the work surface with flour as necessary to prevent sticking. The first lump is pushed down and outward with fingers to coax it into a circular shape, roughly 6" in diameter and ½" thick. The upper third of the dough is pulled and pinched together at the seam, then folded at the lower third up to cover the first and pinched again at the seam. The folded dough is rolled to lengthen it, using the palms and, working from the center of the dough outward to form a baguette loaf about 14" long. Finally, the dough loaves are covered with a cloth or film and let them rise at room temperature for 1 to 1½ hours. In the meantime, the baking container is preheated.

In some embodiments, a Step 506 includes placing a non-stick film member along dough troughs of a perforated baking panel, the edges of the perforated baking panel forming a pair of support legs elevating it above the water capture platform in a parallel spaced-apart relationship. The film member may include a parchment paper known in the art of baking. Another Step 508 comprises aligning the portion of dough along the outer dough troughs. The dough is positioned for baking. A Step 510 includes placing ice in the middle ice trough. The ice can be dropped under the panel handle 128.

A Step 512 may include preheating a baking container, the baking container defined by sidewalls and a bottom wall enclosing a cavity accessible through an opening. While the dough is rising, the baking container 102, and water capture panel 120 with the flanged lid 112 covering opening 110 are placed in the oven and preheated to 450° F. for at least 30 minutes, as this preheat is essential.

In some embodiments, A Step 514 comprises positioning and pre-heating along with the baking container, a water-capture platform in the cavity of the baking container, in a parallel, spaced-apart relationship with the bottom wall. Water-capture platform is configured to captures melted ice water droplets from baking panel 130, and transforms the water to steam 154.

A step 518 Covering and pre-heating a baking container with flanged lid. The lid defined by a perimeter having multiple downward oriented flanges which form a seal with the side walls of the baking container.

Once the baking container and oven reach temperature, the shaped dough is uncovered in Step 520. Using a sharp knife, approximately four long slashes are made across the top of each loaf about ½" deep. The slashes should be staggered making steep diagonal cuts down the length of the shaped dough. The slashes enable expansion.

Method 500 further comprises a Step 521 when at high heat, removing the baking container from the oven to insert the perforated baking panel with the dough and ice for the first "expansion" phase of the baking process and returning the baking container with the dough and ice additions and the lid to the oven on the center oven rack to bake.

After baking covered for 20 minutes, whereby the enclosed baking container retains a substantial amount of moisture as steam released from the melting ice and whereby the generated steam circulates around the dough in the cavity of the baking container. Oven mitts are then used to remove the lid.

In other embodiments, method 500 may also include a Step 522 of, after a set time for the expansion phase, whereby the enclosed baking container retains a substantial amount of moisture as steam released from the melting ice, and whereby the generated steam circulates around the dough in the cavity of the baking container.

A Step 524 Opening the oven and removing the flanged lid from the baking container and closing the oven to begin the browning phase.

A Step 526 The baking container is then baked, uncovered, for an additional 20 to 25 minutes until the crust is a rich golden brown.

A final Step 528 includes removing finished baguettes from dough troughs. The finished baguette is then removed from the oven, and left to cool for 5 minutes before consumption.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An inclusive steaming system for baking dough, the system comprising:

a baking container defined by sidewalls and a bottom wall enclosing a cavity accessible through an opening;

a flanged lid defined by a perimeter having multiple downwardly oriented lid flanges, the flanged lid being operable to cover the opening of the baking container, the lid flanges extending parallel and adjacent to the sidewalls of the baking container, forming a snug relationship with the sidewalls when the flanged lid covers the opening of the baking container, whereby the relationship between the lid flanges and the sidewalls forms a seal;

a water-capture platform defined by at least one longitudinal depression, a pair of longitudinal platform flanges, and a pair of traversing platform edges, the water-capture platform disposed in a parallel, spaced-apart relationship with the bottom wall of the baking container, whereby the water-capture platform fits in the cavity of the baking container, such that the platform edges engage the sidewalls in a snug relationship; and a perforated baking panel defined by multiple longitudinal troughs disposed in a parallel relationship, the perforated baking panel further being defined by a pair of longitudinal panel edges and a pair of traversing panel edges, the longitudinal panel edges forming a pair of support legs, the perforated baking panel further being defined by a plurality of apertures, the perforated baking panel disposed in a parallel, spaced-apart relationship between the flanged lid and the water-capture platform, whereby the perforated baking panel fits in the cavity of the baking container, such that the panel edges engage the sidewalls in a snug relationship, whereby the pair of support legs rest on the longitudinal platform edges of the water-capture platform, whereby the perforated baking panel is elevated above the water-capture platform; and whereby the baking container, the water capture platform, and the flanged lid are fabricated from stainless steel having a thermal capacity sufficient to a temperature of at least 450 degrees, so as to enable the release of steam from the dough and the ice on the perforated baking panel.

2. The system of claim 1, further comprising a pair of container handles affixed to the sidewalls of the baking container.

3. The system of claim 1, further comprising a panel handle affixed to the baking panel.

4. The system of claim 1, further comprising a lid handle affixed to the flanged lid.

5. The apparatus of claim 1, wherein the sidewalls and bottom wall of the baking container form a generally elongated, rectangular shape, having dimensions of about 9 inches×18 inches×4 inches.

6. The system of claim 1, wherein the distance between the water-capture platform and the perforated baking panel is at least 1.5 inches.

7. The system of claim 1, wherein the perforated baking panel comprises 0.060 perforated aluminum.

8. The system of claim 1, wherein the troughs are defined by a peak having a radial curve of about 0.2614.

9. The system of claim 1, wherein the multiple longitudinal troughs comprise a middle ice trough and a pair of outer dough troughs.

10. The system of claim 9, wherein the middle ice trough is disposed between the outer dough troughs.

11. The system of claim 10, wherein the ice trough is operable to enable retention of ice.

12. The system of claim 9, wherein the dough troughs are operable to enable retention of dough.

13. The system of claim 9, wherein the ice in the middle ice trough melts to water and falls to the longitudinal depression of the water-capture platform.

14. The system of claim 9, wherein the system is heated, such that the ice melts in the middle ice trough and the heat from the water-capture platform transforms the melted ice water to steam, wherein the steam at least partially bakes the dough.

15. The system of claim 1, wherein the elevated disposition of the perforated baking panel and the apertures in the perforated baking panel form a space for circulation of steam around the dough.

16. An inclusive steaming system for baking dough, the system comprising:

a baking container defined by sidewalls and a bottom wall enclosing a cavity accessible through an opening;

a pair of container handles affixed to the sidewalls of the baking container;

a flanged lid defined by a perimeter having multiple downwardly oriented lid flanges, the flanged lid being operable to cover the opening of the baking container, the lid flanges extending parallel and adjacent to the sidewalls of the baking container, forming a snug relationship with the sidewalls when the flanged lid covers the opening of the baking container, whereby the relationship between the lid flanges and the sidewalls forms a seal;

a lid handle affixed to flanged lid;

a water-capture platform defined by at least one longitudinal depression, a pair of longitudinal platform flanges, and a pair of traversing platform edges, the water-capture platform disposed in a parallel, spaced-apart relationship with the bottom wall of the baking container, whereby the water-capture platform fits in the cavity of the baking container, such that the platform edges engage the sidewalls in a snug relationship;

a perforated baking panel defined by three longitudinal troughs disposed in a parallel relationship, the perforated baking panel further being defined by a pair of longitudinal panel edges and a pair of traversing panel edges, the longitudinal panel edges forming a pair of support legs, the perforated baking panel further being defined by a plurality of apertures, the perforated baking panel disposed in a parallel, spaced-apart relationship between the flanged lid and the water-capture platform, whereby the perforated baking panel fits in the cavity of the baking container, such that the panel edges engage the sidewalls in a snug relationship, whereby the pair of support legs rest on the longitudinal platform edges of the water-capture platform, whereby the distance between the water-capture platform and the perforated baking panel is at least 1.5 inches, whereby the perforated baking panel is elevated above the water-capture platform; and a panel handle affixed to the baking panel.

17. The system of claim 16, wherein the three longitudinal troughs comprise a middle ice trough and a pair of outer dough troughs.

18. The system of claim 17, wherein the ice trough is operable to enable retention of ice, and the dough troughs are operable to enable retention of dough.

19. A method of baking bread with self-induced steam, the method comprising:

mixing a batch of dough, the dough comprised of the following ingredients: water, flour, salt, and yeast;

forming the dough into an elongated shape;

providing a baking container, the baking container defining sidewalls, a bottom wall, and an opening, the sidewalls forming a cavity;

placing a water capture platform in the cavity of the baking container, the water capture platform being disposed in a parallel, spaced-apart relationship with the bottom wall;

placing a flanged lid over the opening in the baking container;

heating an oven to a first predetermined temperature;

introducing the baking container into the oven for a first predetermined duration, whereby the baking container, the water capture platform, and the flanged lid are preheated;

removing, after the first predetermined duration, the baking container from the oven;

removing the flanged lid from the opening in the baking container;

introducing the elongated dough into the outer dough troughs of the perforated baking panel;

introducing ice into the ice trough;

placing a perforated baking panel over the water capture platform, the perforated baking panel defining three longitudinal troughs, the troughs comprising a middle ice trough and a pair of outer dough troughs, the perforated baking panel further defining a pair of traversing panel edges, the panel edges elevating the perforated baking panel over the water capture platform;

placing the flanged lid over the opening in the baking container, whereby the flanges of the flanged lid form a snug relationship with the sidewalls of the baking container;

reintroducing the baking container into the oven for a second predetermined duration, whereby the ice melts into water and falls through the perforations in the outer dough troughs, whereby the preheated water capture platform produces steam from the water, whereby the steam released from the dough and the steam produced from the ice circulate between the water capture platform and the perforated baking panel, whereby the flanges in the flanged lid restricts steam from escaping from the baking container, whereby the steam enhances the baking process of the dough;

removing the baking container from the oven;

removing the lid from the opening of the baking container;

reintroducing the baking container into the over for a third predetermined duration, the third predetermined duration being shorter than the first and second predetermined durations, whereby removing the flanged lid enables the dough to form an at least partially brown surface; and removing the baking container with the baked bread from the oven.

20. The method of claim 19, wherein the baking container, the water capture platform, and the flanged lid are fabricated from stainless steel having a thermal capacity sufficient to maintain a temperature of at least 450 degrees, so as to enable the release of steam from the dough and the ice on the perforated baking panel.

* * * * *